(12) United States Patent
Barneycastle

(10) Patent No.: US 12,420,749 B2
(45) Date of Patent: Sep. 23, 2025

(54) WHEEL CHOCK WITH STOWABLE AND EASE OF USE FUNCTIONALITY

(71) Applicant: Melvin Teddy Barneycastle, King, NC (US)

(72) Inventor: Melvin Teddy Barneycastle, King, NC (US)

(*) Notice: Subject to any disclaimer, the term of this patent is extended or adjusted under 35 U.S.C. 154(b) by 371 days.

(21) Appl. No.: 18/181,268

(22) Filed: Mar. 9, 2023

(65) Prior Publication Data

US 2023/0286474 A1 Sep. 14, 2023

Related U.S. Application Data

(60) Provisional application No. 63/318,824, filed on Mar. 11, 2022.

(51) Int. Cl.
*B60T 3/00* (2006.01)

(52) U.S. Cl.
CPC ...................... *B60T 3/00* (2013.01)

(58) Field of Classification Search
None
See application file for complete search history.

(56) References Cited

U.S. PATENT DOCUMENTS

| | | | | |
|---|---|---|---|---|
| 1,617,839 A | * | 2/1927 | Fennell | B60P 3/077 |
| | | | | 188/32 |
| 1,837,657 A | * | 12/1931 | Fedderman | B60T 3/00 |
| | | | | 144/353 |
| 4,781,271 A | * | 11/1988 | Wokeck | B60T 3/00 |
| | | | | 521/54 |
| 4,917,219 A | * | 4/1990 | Henry | B60T 3/00 |
| | | | | 293/109 |
| 2018/0345946 A1 | * | 12/2018 | Bowman | B65G 69/005 |
| 2019/0299943 A1 | * | 10/2019 | Gregory | B60T 7/20 |

FOREIGN PATENT DOCUMENTS

| | | | |
|---|---|---|---|
| JP | 2020131938 A | * | 8/2020 |
| KR | 200414367 Y1 | * | 4/2006 |
| KR | 20090010083 U | * | 10/2009 |

OTHER PUBLICATIONS

KR200414367Y1: English Machine Translation (Year: 2006).*
KR20090010083U: English Machine Translation (Year: 2009).*
JP-2020131938-A: English Machine Translation (Year: 2020).*

* cited by examiner

*Primary Examiner* — Melanie Torres Williams
(74) *Attorney, Agent, or Firm* — NK Patent Law

(57) ABSTRACT

A wheel chock includes a base member defining a generally triangular prism shape having two triangular side and three faces joining the edges of the sides. A gripping surface defined on at least one of the faces. A handle, for being grasped by a user, disposed on either one of the sides or one of the faces adjacent the face defining the gripping surface. A magnet disposed along one of the sides of the base member, such that at least a portion of the magnet is recessed within the base member. The magnet allows the chock to have a stowed position in which the device is magnetically coupled with a ferrous surface of an equipment, and an in use position in which the chock is positioned near a wheel.

19 Claims, 9 Drawing Sheets

WHEEL CHOCK WITH STOWABLE AND EASE OF USE FUNCTIONALITY

CROSS-REFERENCE TO RELATED APPLICATIONS

This application claims benefit of and priority to U.S. Provisional Patent Application No. 63/318,824 which was filed on Mar. 11, 2022, the entire contents of which is hereby incorporated by reference in its entirety.

TECHNICAL FIELD

The presently disclosed subject matter is directed towards a chock for a trailer, equipment, or other structure having one or more tires, where the chock prevents unintended rotation of one or more tires.

BACKGROUND

Modern vehicles and equipment are normally supplied with emergency or parking brake systems that function to maintain the vehicle in a fixed position. Such systems usually operate on the wheels of the vehicle and are intended to prevent the wheels from rotating while the vehicle is parked and to thereby prevent the vehicle from accidentally moving. However, sometimes these systems can fail or still allow for some wheel movement. The unintended consequences of either can be catastrophic.

To promote safety and further prevent movement, commercially used cargo and work vehicles, such as trucks or trailers of a tractor-trailer combination, or heavy equipment, such as skid steers, are also provided with supplemental systems for preventing wheel rotation and vehicle movement. Typically, such vehicles carry wedge shaped, wheel chocks that are to be manually placed in front and/or behind a tire mounted on a wheel of the vehicle when it is parked. In many cases, the use of such tire engaging wheel chocks is mandated by government regulation or regulations of the trucking firm or its clients. For example, state and federal regulations, as well as company or trucking firm rules, require that drivers of vehicles, e.g., single axle delivery trucks, place at least one wheel chock forward and one wheel chock rearward of a drive wheel tire at every stop that the vehicle makes. Even the Occupational Safety and Health Administration (OSHA) requires the use of wheel chocks in certain instances. In use, each wheel chock is normally hand wedged against the tire and ground or pavement surface. Although the wheel chocks contact and are wedged between the tire surface and the ground or pavement, they are customarily referred to as "wheel chocks" rather than "tire chocks."

While the consistent and correct use of such wheel chocks serves the function of preventing runaway of a vehicle, chocks are not always available when the vehicle is parked, or the driver may forget to place them in position or may place them improperly. Moreover, it is common for operators to misplace the chocks, leave them on site, or forget about them. Additionally, once a chock is in place, it can be hard to remove if the wheel has rolled towards the chock and load bearing is then placed on the chock. Further, an improperly placed wheel chock may also slip or move aside if the vehicle is jarred or is on an incline. The failure to place a wheel chock or the failed function of the wheel chock can result in property damage, personal injury, and/or the imposition of sanctions against the driver and his employer. If hazardous materials are involved, environmental damage and personal injury of others can also result. Accordingly, improvements to wheel chocks are needed.

SUMMARY

This summary is provided to introduce in a simplified form concepts that are further described in the following detailed descriptions. This summary is not intended to identify key features or essential features of the claimed subject matter, nor is it to be construed as limiting the scope of the claimed subject matter.

Disclosed herein is a wheel chock that, according to one or more embodiments, includes a base member defining a generally triangular prism shape having two triangular sides and three faces joining the edges of the sides. According to embodiments, a gripping surface is defined on one of the faces and a handle is disposed on either one of the sides or one of the faces adjacent the face defining the gripping surface. According to various embodiments, a first magnet is disposed along one of the sides of the base member and a portion of the first magnet is recessed within the base member.

According to one or more embodiments, the handle is removably attached to one of the sides of the base member.

According to one or more embodiments, the handle is removably attached to one of the faces adjacent the one of the faces defining the gripping surface of the base member.

According to various embodiments, the wheel chock further comprises an attachment port disposed on one or more of one of the sides or one of the faces of the base member, the attachment port configured to selectively engage a portion of the handle to removably attach the handle to the base member.

According to some embodiments, the base member defines a recess therein. According to certain embodiments, one of the faces or one of the sides of the base member defines an opening configured to allow access to the recess. According to various embodiments, the wheel chock further comprises a plug configured to selectively seal the opening. According to at least one embodiment, the wheel chock further comprises a weighted material disposed within the recess.

According to one or more embodiments, the wheel chock further comprises a fastener having a first portion disposed within the recess and a second portion engaged with the first magnet. According to at least one embodiment, the fastener extends through an opening in the side of the base member along with the first magnet is disposed. According to select embodiments, the opening comprises a first set of threads which engage a second set of threads disposed along a portion of the fastener.

According to one or more embodiments, the wheel chock further comprises a fastener having a first portion disposed within the recess and a second portion engaged with the handle.

According to one or more embodiments, the handle is pivotally attached to the base member so that it pivots between a first position where the handle extends away from the base member and a second position where the handle extends into the recess. According to various embodiments, the handle is integrally formed with the base member.

According to one or more embodiments, the gripping surface comprises a plurality of protrusions extending away from the base member. According to at least one embodiment, at least one of the plurality of protrusions is affixed to the base member.

According to one or more embodiments, the gripping surface comprises a gripping member having a first surface affixed to the base member and a second surface opposed to the first, the second surface comprising protrusions. According to at least one embodiment, the gripping member is removably affixed to the base member.

According to one or more embodiments, the wheel chock further comprises a second magnet disposed on an opposed side of the base member from the first magnet.

According to various embodiments, the first magnet is removably attached to the base member.

BRIEF DESCRIPTION OF THE DRAWINGS

The foregoing, as well as the following Detailed Description of preferred embodiments, is better understood when read in conjunction with the appended drawings. For the purposes of illustration, there is shown in the drawings exemplary embodiments; however, the presently disclosed subject matter is not limited to the specific methods and instrumentalities disclosed.

The embodiments illustrated, described, and discussed herein are illustrative of the present invention. As these embodiments of the present invention are described with reference to illustrations, various modifications or adaptations of the methods and or specific structures described may become apparent to those skilled in the art. It will be appreciated that modifications and variations are covered by the above teachings and within the scope of the appended claims without departing from the spirit and intended scope thereof. All such modifications, adaptations, or variations that rely upon the teachings of the present invention, and through which these teachings have advanced the art, are considered to be within the spirit and scope of the present invention. Hence, these descriptions and drawings should not be considered in a limiting sense, as it is understood that the present invention is in no way limited to only the embodiments illustrated.

DETAILED DESCRIPTION

Figure 1:
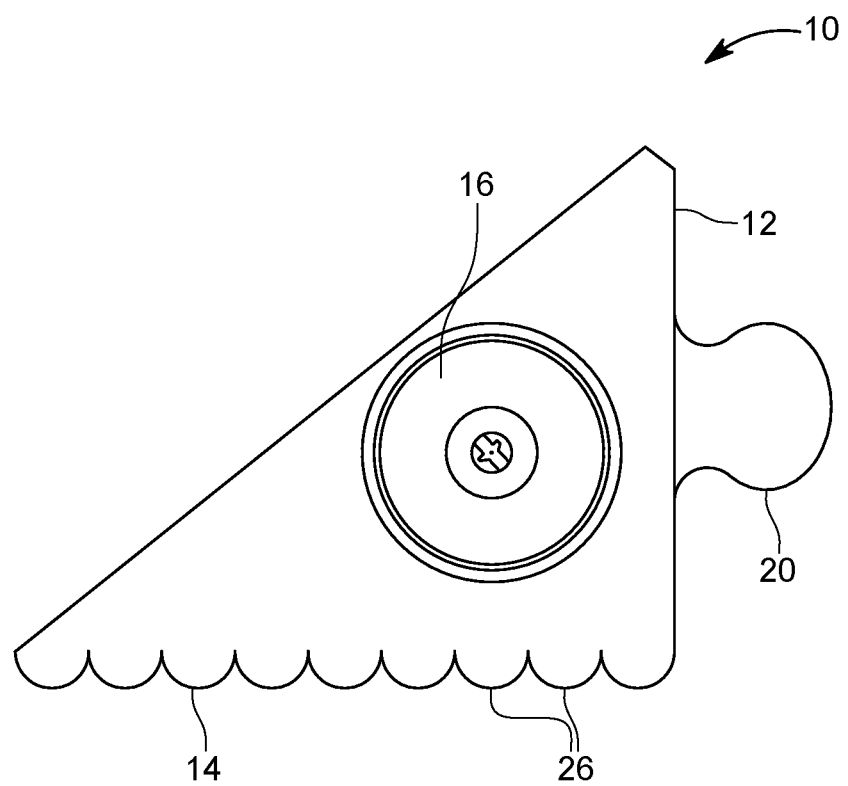
FIG. 1 is a front view of a wheel chock according to one or more embodiments disclosed herein.
Figure 2:
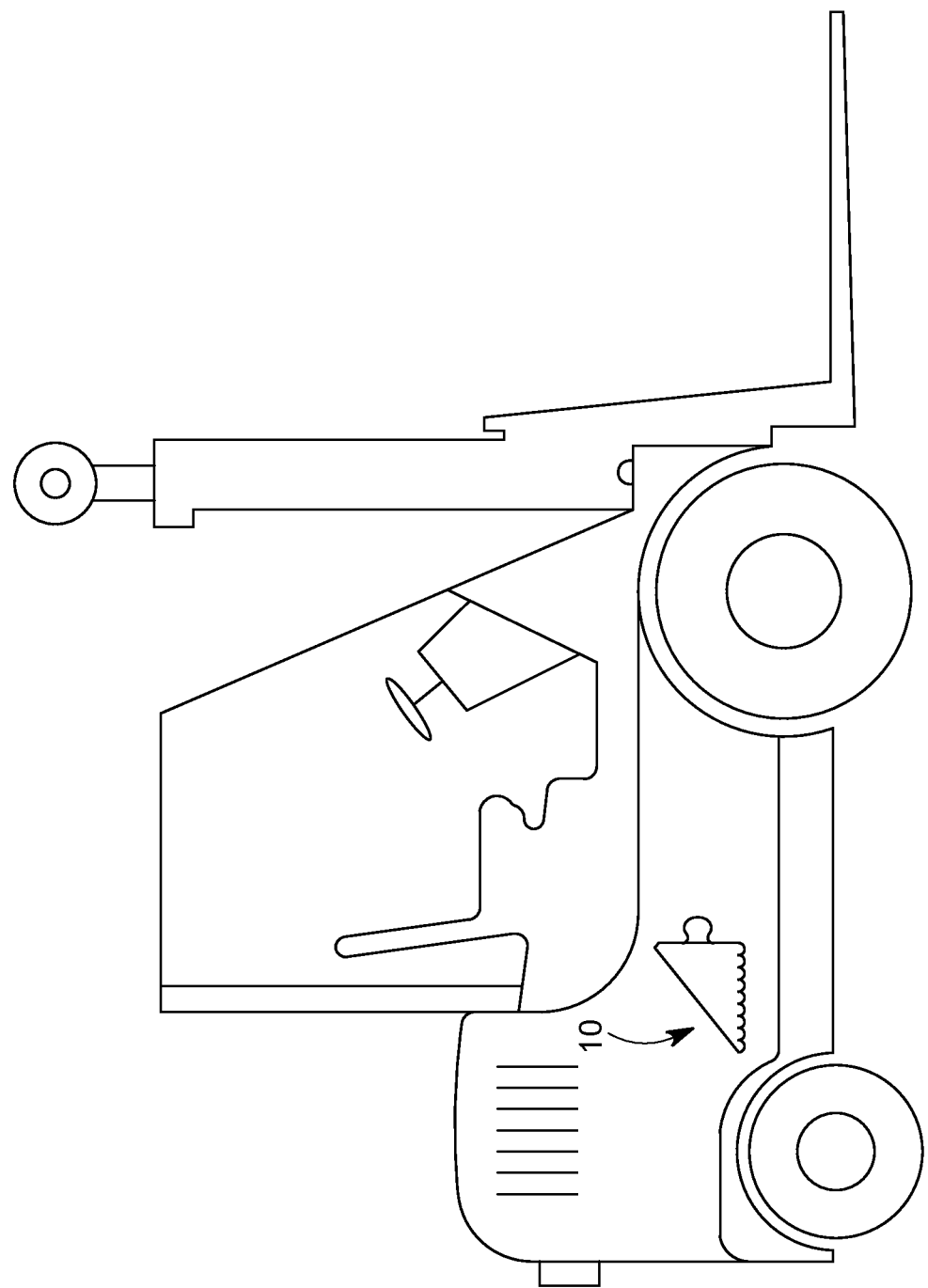
FIG. 2 is a side view of a wheel chock according to one or more embodiments disclosed herein engaged and held on machinery equipment by use of a magnet.

These descriptions are presented with sufficient details to provide an understanding of one or more particular embodiments of broader inventive subject matters. These descriptions expound upon and exemplify particular features of those particular embodiments without limiting the inventive subject matters to the explicitly described embodiments and features. Considerations in view of these descriptions will likely give rise to additional and similar embodiments and features without departing from the scope of the inventive subject matters. Although the term "step" may be expressly used or implied relating to features of processes or methods, no implication is made of any particular order or sequence among such expressed or implied steps unless an order or sequence is explicitly stated.

Any dimensions expressed or implied in the drawings and these descriptions are provided for exemplary purposes. Thus, not all embodiments within the scope of the drawings and these descriptions are made according to such exemplary dimensions. The drawings are not made necessarily to scale. Thus, not all embodiments within the scope of the drawings and these descriptions are made according to the apparent scale of the drawings with regard to relative dimensions in the drawings. However, for each drawing, at least one embodiment is made according to the apparent relative scale of the drawing.

Unless defined otherwise, all technical and scientific terms used herein have the same meaning as commonly understood to one of ordinary skill in the art to which the presently disclosed subject matter pertains. Although any methods, devices, and materials similar or equivalent to those described herein can be used in the practice or testing of the presently disclosed subject matter, representative methods, devices, and materials are now described.

Following long-standing patent law convention, the terms "a", "an", and "the" refer to "one or more" when used in the subject specification, including the claims. Thus, for example, reference to "a device" can include a plurality of such devices, and so forth.

Unless otherwise indicated, all numbers expressing quantities of components, conditions, and so forth used in the specification and claims are to be understood as being modified in all instances by the term "about". Accordingly, unless indicated to the contrary, the numerical parameters set forth in the instant specification and attached claims are approximations that can vary depending upon the desired properties sought to be obtained by the presently disclosed subject matter.

As used herein, the term "about", when referring to a value or to an amount of mass, weight, time, volume, concentration, and/or percentage can encompass variations of, in some embodiments +/−20%, in some embodiments +/−10%, in some embodiments +/−5%, in some embodiments +/−1%, in some embodiments +/−0.5%, and in some embodiments +/−0.1%, from the specified amount, as such variations are appropriate in the presently disclosed subject matter.

In one embodiment, a wheel chock 10 is disclosed that includes a base member 12 that defines a generally triangular prism shape having two generally triangular sides 17 and at least three faces 18 joining the edges of the sides 17, as in FIG. 1. However, it is foreseen that any other appropriate shape may be employed. Indeed, the shape of the base member 12 of FIG. 1 could be technically considered a trapezoidal prism shape. Herein and in the claims, the use of the term generally triangular prism shape is meant to encompass both triangular prism shape and trapezoidal prism shape. Moreover, it is also foreseen that one or more of the faces 18 may have portions which are concave or convex in nature in embodiments. The base member 12 may be of a solid construction or may be hollow in embodiments. Indeed, a recess 22 is shown in embodiments in FIGS. 4A, 5-8, and 11-12B, herein. In various embodiments, the base member 12 may be made of rubber, injection molded plastic, or metal with certain portions formed with or of a gripping or cushiony structure, texture, and/or material.

Figure 9:
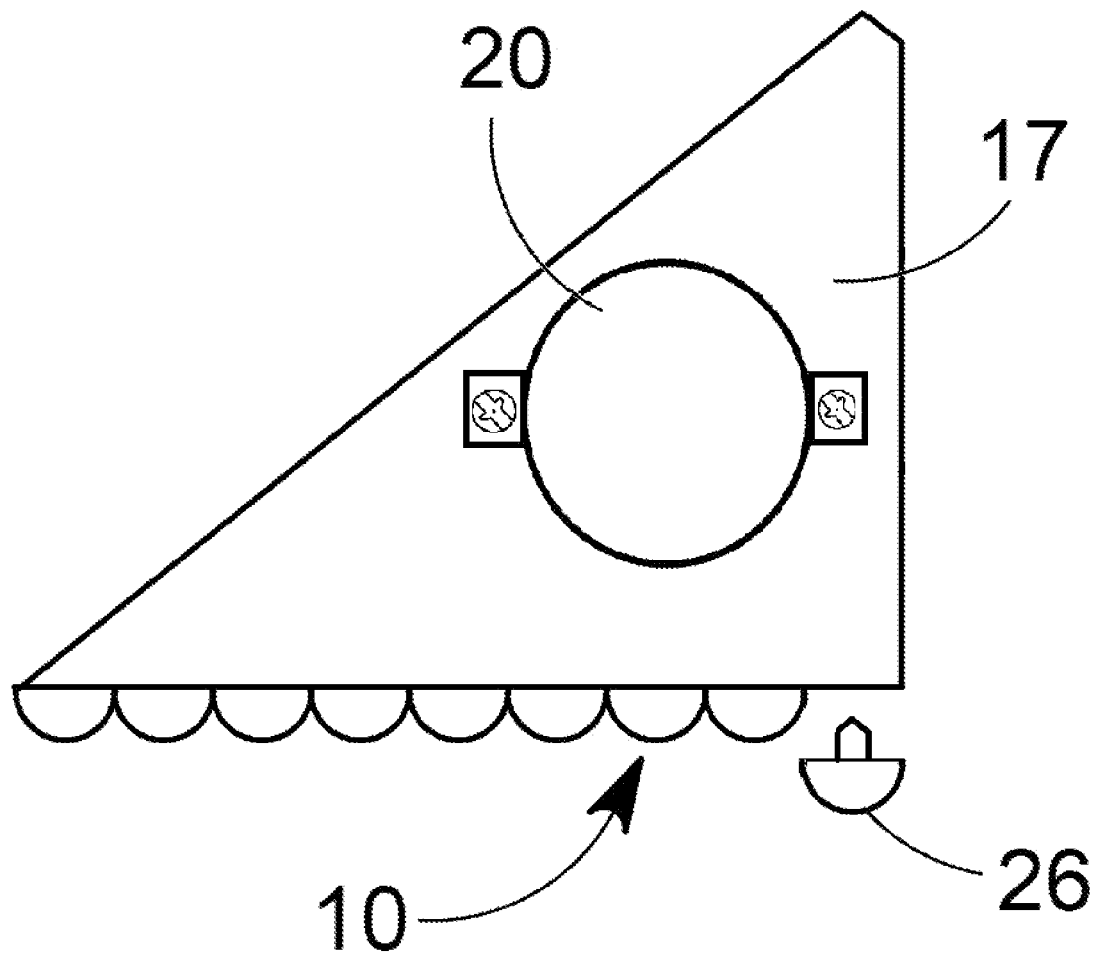
FIG. 9 is a side view of a wheel chock according to one or more embodiments disclosed herein having a removably attached handle disposed on a side of the base member and removably attached protrusions on a bottom face of the base member.
Figure 10:
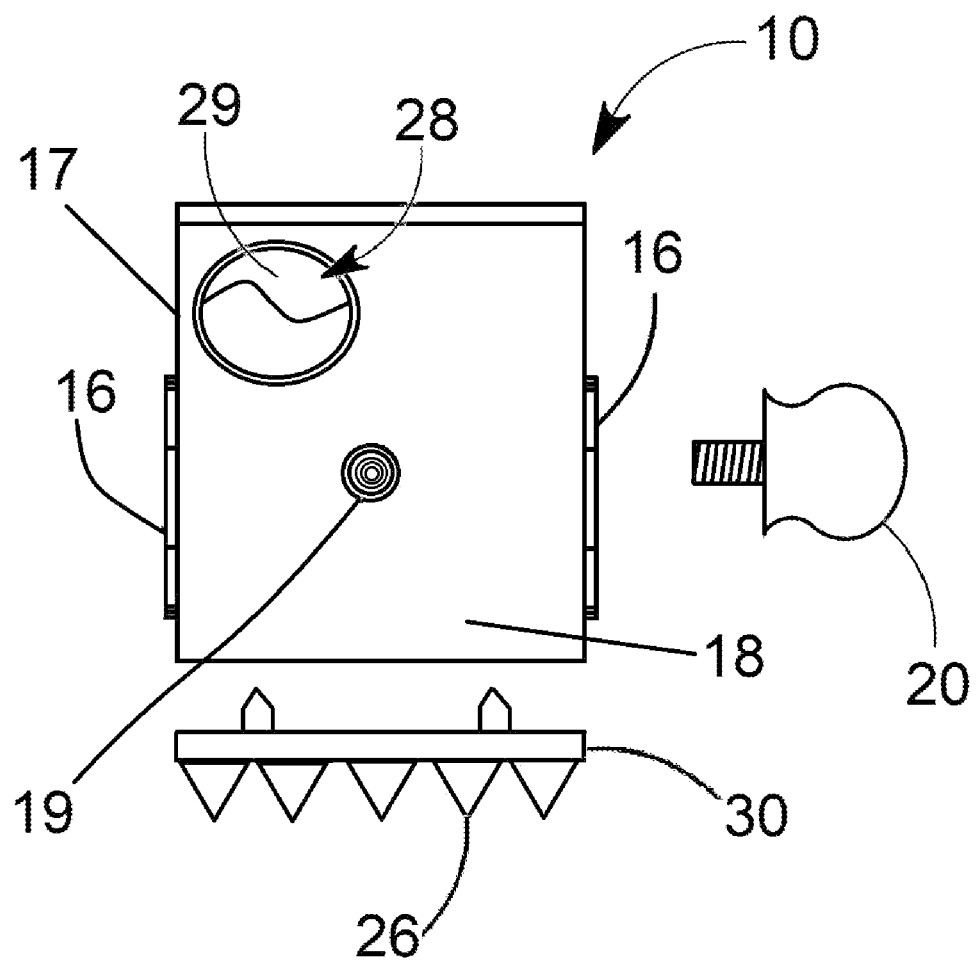
FIG. 10 is a back face view of a wheel chock according to one or more embodiments disclosed herein having a removably attached handle removed to show the attachment port with threads therein which engages threads along a shaft extending from the handle, having a gripping member carrying protrusions which removably attaches to the bottom face of the base member, and having an opening into a recess which is selectively sealed with a plug.

A gripping surface 14 is defined on a bottom face of the base member 12 in embodiments. As shown in FIGS. 1-3 and 5, 7 and 8, embodiments of the gripping surface can include any number of protrusions 26 extending away from the base member. Moreover, as shown in FIG. 9, the protrusions 26 may be removably affixed to the base member 12 in embodiments. Indeed, as shown in the embodiment of FIG. 10, the protrusions 26 may be disposed upon another structure, such as a gripping member 30 which removably affixes all or a portion of the protrusions 26 to the base member 12. In such an embodiment, the gripping member 30 has a first surface which removably affixes to the base member 12 and an opposed second surface comprising protrusions 26. The ability to removably affix all or a portion of the protrusions 26 allows for versatility, such as allowing for the replacement of one type of protrusion 26 for another in embodiments, and longevity, such as by allowing for the replacement of worn out or damaged protrusions 26 in embodiments. In alternative embodiments, the gripping surface 14 may have a relatively flat surface if sufficient friction or other forces can be generated for the chock 10 to function. Indeed, texture-such as that provided by the protrusions 26—may not be necessary if the material comprising the bottom face 18 of the base member 12 provides a useful or desirable level of frictional engagement. In various embodiments, the texture provided by the protrusions 26 may comprise bumps, as in FIG. 9, or ridges, as in FIG. 1, 4A, 5, and 7-8, or teeth, as in FIG. 10.

In embodiments, a magnet 16 is formed into a side 17 of the base member 12, such that at least a portion of the magnet 16 is recessed into the base member 12. In embodiments, only a small portion of the magnet 16 protrudes from the base member, as in FIG. 4A, 8, and 10-12B. This advantageously provides a nominal amount of locking of the wheel chock 10 against an equipment surface, such as in FIG. 2. The recess of the magnet 16 is sufficient to induce a torque moment to the chock 10, in embodiments. However, in such embodiments, not so much of the magnet 16 protrudes from the base member 12 that significant torque moments can be generated that would dislodge the chock 10 from the surface of equipment.

Figure 4A:
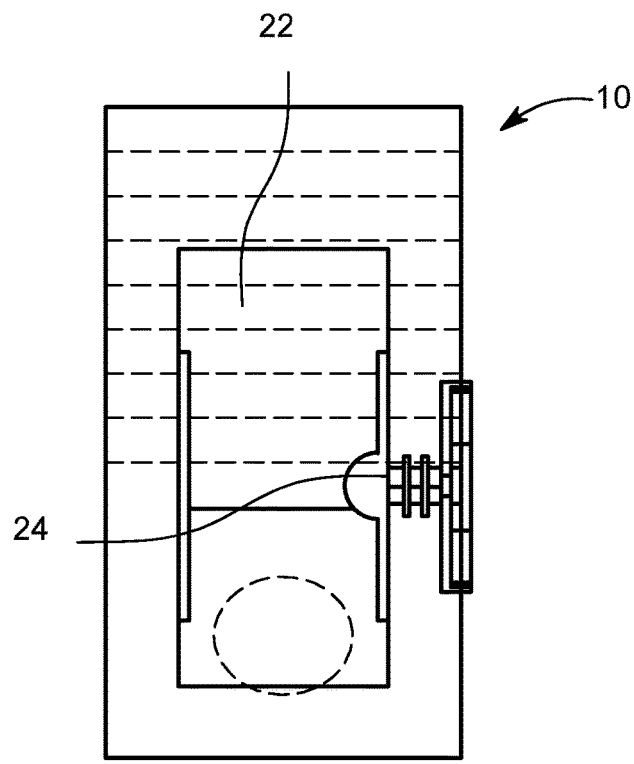
FIG. 4A is a top view of a wheel chock according to one or more embodiments disclosed herein having one of the faces removed for illustrative purposes to show the recess and the fastener and having dashed lines representing the handle and protrusions on other not visible portions of the base member.
Figure 4B:
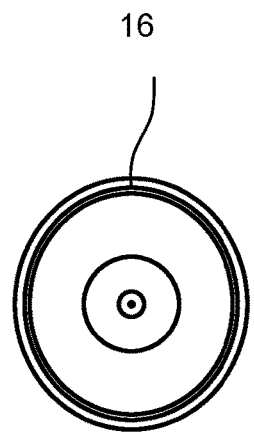
FIG. 4B is a side view of a magnet portion of a wheel chock according to one of more embodiments disclosed herein.
Figure 4C:
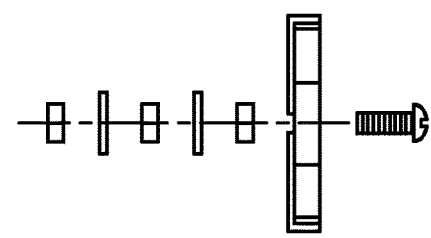
FIG. 4C is a top exploded view of a portion of the magnet and fastener of a wheel chock according to one of more embodiments disclosed herein.
Figure 5:
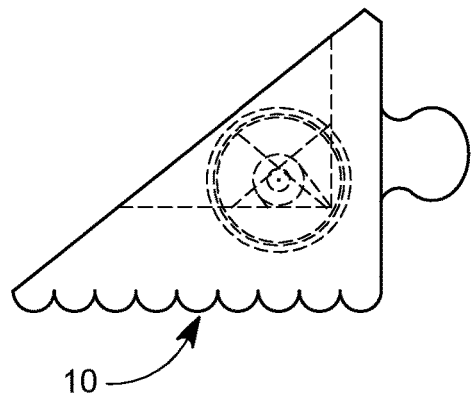
FIG. 5 is a side view of a wheel chock according to one of more embodiments disclosed herein illustrating one of the triangular sides opposed to that along which the magnet is disposed and having dashed lines representing the recess inside and magnet on the other not visible side of the base member.
Figure 6:
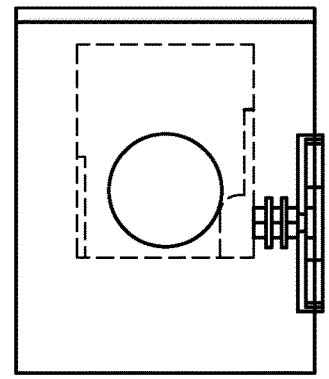
FIG. 6 is a back face view of a wheel chock according to one or more embodiments disclosed herein showing the handle, showing the recess in dashed lines and having a portion of a face thereof removed to show the fastener and magnet carried by the base member.
Figure 7:
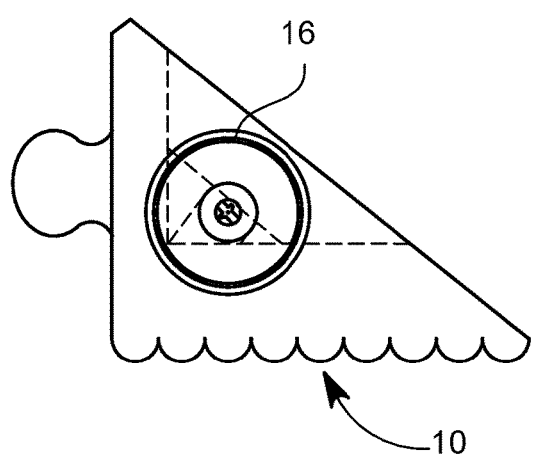
FIG. 7 is a side view of a wheel chock according to one of more embodiments disclosed herein illustrating one of the triangular sides along which the magnet is disposed and having dashed lines representing the recess inside the base member.
Figure 8:
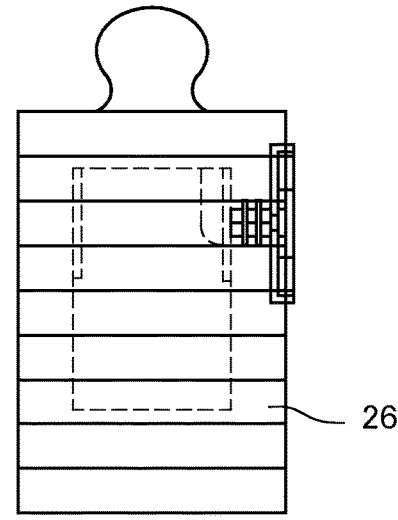
FIG. 8 is a bottom view of a wheel chock according to one or more embodiments disclosed herein having a portion of a bottom face removed for illustrative purposes to show the fastener, having dashed lines representing the recess of the base member and showing a variation of protrusions which are disposed along a face between sides of the base member.

In construction, the magnet 16, an embodiment of which is shown in FIG. 4B, may be added to the base member 12 in a particular embodiment by removing a segment of material from the base member 12 and the inserting the magnet 16 therein. Alternatively, the magnet recess area may be formed in an injection molding process in another embodiment. In embodiments, the magnet 16 may be affixed to the base member 12 using a fastener 24 having a portion disposed within a recess 22 and another portion engaged with the magnet 16 as in FIGS. 4A, 6 and 8. In at least one embodiment, the magnet 16 might be affixed to the base member 12 and the fastener 24 through a screw passing through an opening in the magnet 16 itself, as in FIG. 4C. In embodiments, the fastener 24 extends through an opening in the side 17 of the base member 12 along which the magnet 16 is disposed. In alternatives, the fastener 24 may only extend into the base member 12 being either too short to reach a recess 22 or in embodiments where the base member 12 does not define a recess 22. In at least one embodiment, the magnet 16 itself might be shaped like a screw or bolt and have threaded portions to selectively engage threads in an opening along the base member 12 or might be otherwise formed into portions of the base member. Moreover, the wheel chock 10 might have more than one magnet 16 disposed along portions of its base member 12 in embodiments. For example, a magnet 16 may be disposed in each of the two opposing sides 17 of the base member 12, as in FIG. 10.

Figure 11:
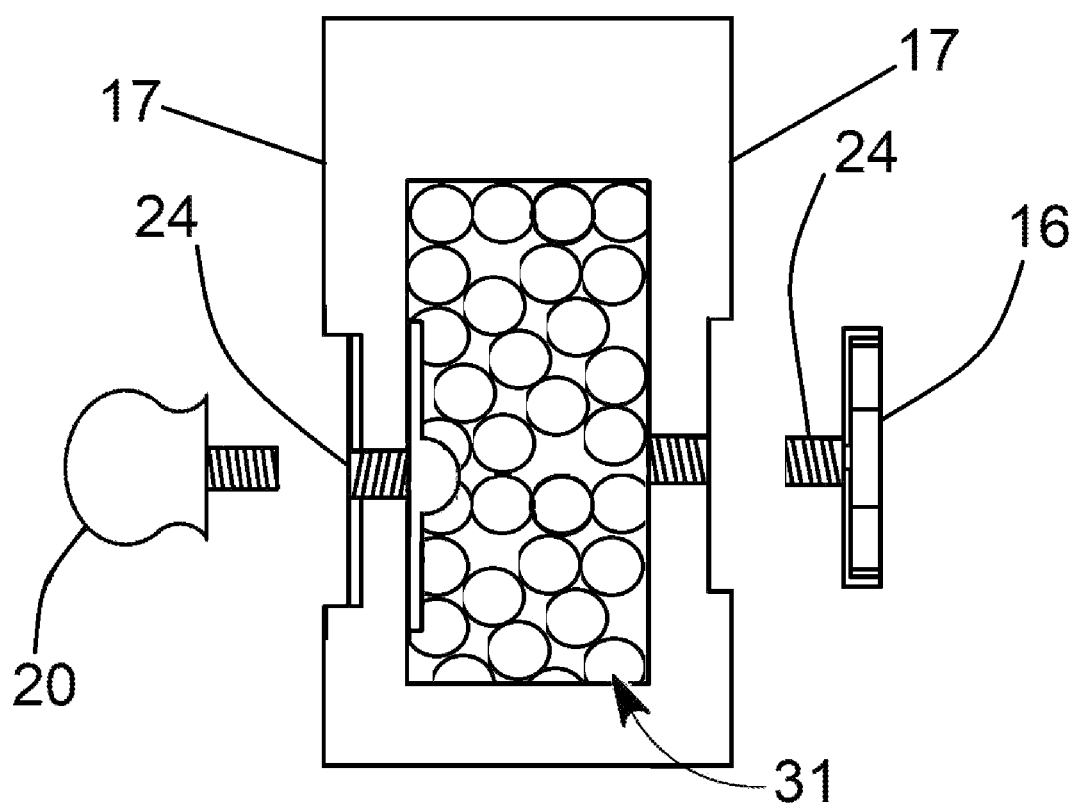
FIG. 11 is a top view of a wheel chock according to one or more embodiments having a face removed to show the recess having weighted material therein, having a handle which engages with a fastener disposed on a side of the base member and having a magnet and fastener having threads which engage threads disposed along an opening in a side of the base member.
Figure 12A:
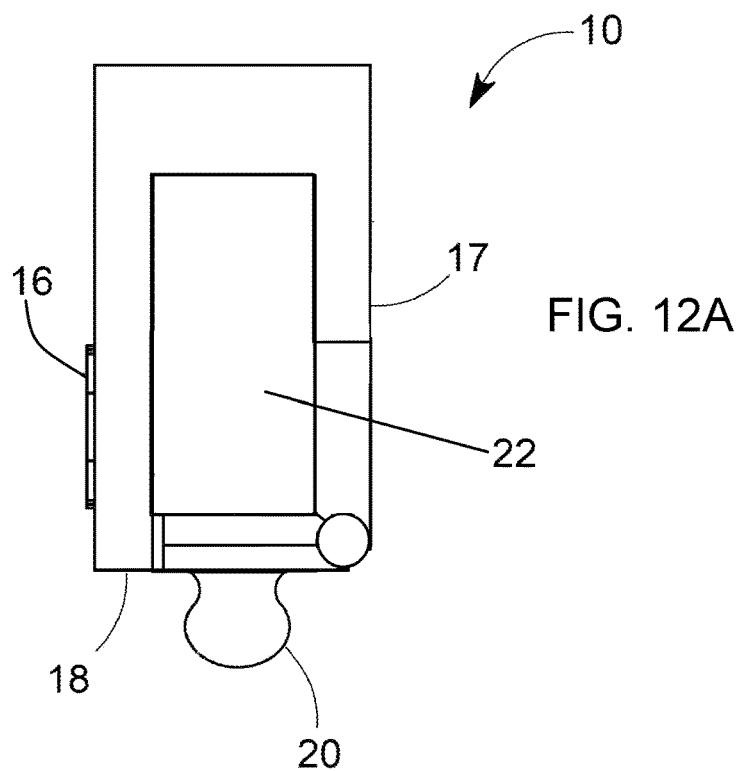
FIG. 12A is a top view of a wheel chock according to one or more embodiments having a face removed to show the recess having a handle which is pivotally attached to the base member so that in one position the handle extends away from the base member, as shown.
Figure 12B:
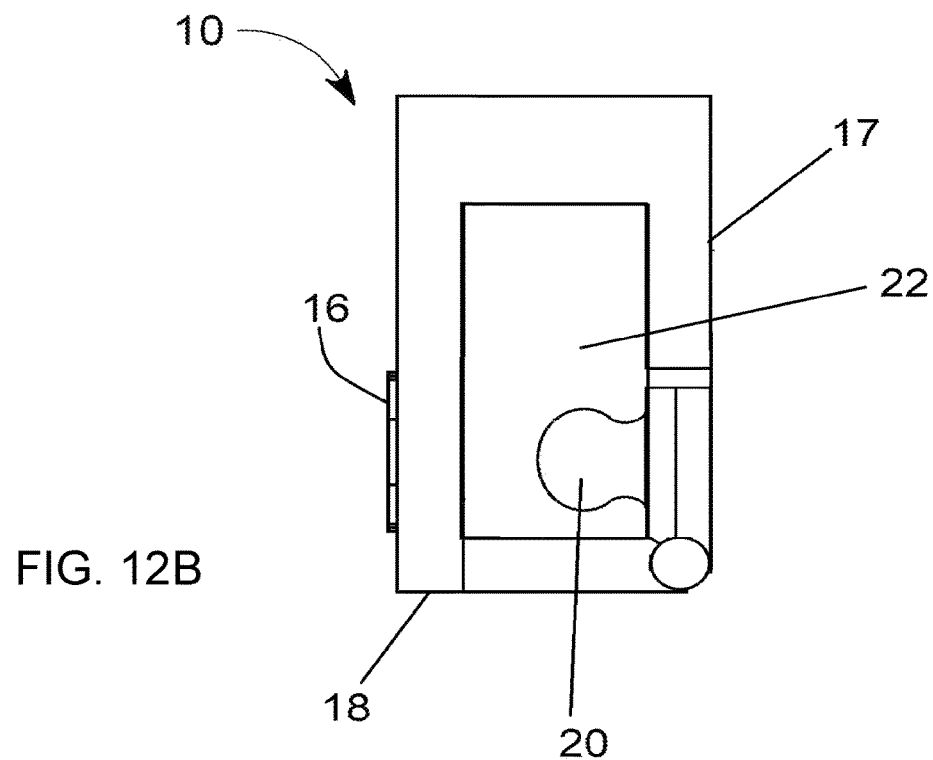
FIG. 12B is a top view of a wheel chock according the embodiment of FIG. 12A having a face removed to show the recess having the pivotally attached handle extending into the recess, as shown.

In certain embodiments, the fastener 24 may comprise threads which engage with threads disposed along a portion of an opening, as in FIG. 11. Thereby, a fastener 24 itself can be removable from the base member 12, as in the fastener 24 for the magnet 16 in FIG. 11, or may be formed into the base member 12 so that the fastener 24 is not removable, as in the fastener 24 into which the handle 20 is selectively attached in FIG. 11. Indeed, the base member 12 might comprise an attachment port 19, disposed along a face 18 thereof, configured to selectively engage a portion of a handle 20, such as a threaded shaft to removably attach the handle 20 to a base member 12 in embodiments, such as in FIG. 10. While all of the illustrated and discussed embodiments up to now have discussed fasteners 24 and openings for fasteners 24 disposed along sides 17 of the base member 12, each might be employed on a face 18 of the base member 12, such as the attachment port 19 on the back face 18 in FIG. 10. Similarly, magnets 16 or handles 20 may also be disposed along any side 17 or face 18 of the base member 12. Moreover, the use of fasteners 24 provides the ability to remove and replace or resize the magnet 16 or handle 20 as desired in embodiments. Indeed, in at least one embodiment, the handle 20 and the magnet 16 might be interchanged or their positions along the base member 12 swapped.

In embodiments, a handle 20 extends from the base member 10 for being grasped by a user, as in FIG. 1. Though the handle 20 is illustrated with a knob shape construction in the embodiments herein, the handle 20 is not limited to this shape and may be any useful alternative shape, such as an O-ring. In embodiments, the handle 20 may be integrally formed with the base member 12, as in FIG. 1. Alternatively, the handle may be removably attached through the use of a bolt or similar, as in FIG. 9, or may itself have a threaded shaft to be selectively engaged by an attachment port 19, as in FIG. 10, or fastener 24, as in FIG. 11. In at least one embodiment, the handle 20 may be pivotally connected to the base member 12 so that it might be pivoted between an extended and recessed position, as in FIGS. 12A and 12B. The ability to selectively remove the handle or pivot it into a position where it extends into a recess 22 allows the base member 12 to maintain a low profile in embodiments. The handle might be disposed on any portion of the base member 12, in embodiments. For example, the handle is disposed on a side 17 in FIGS. 9 and 11, and a face 18 in FIGS. 1, 4A, 5-8.

Figure 3:
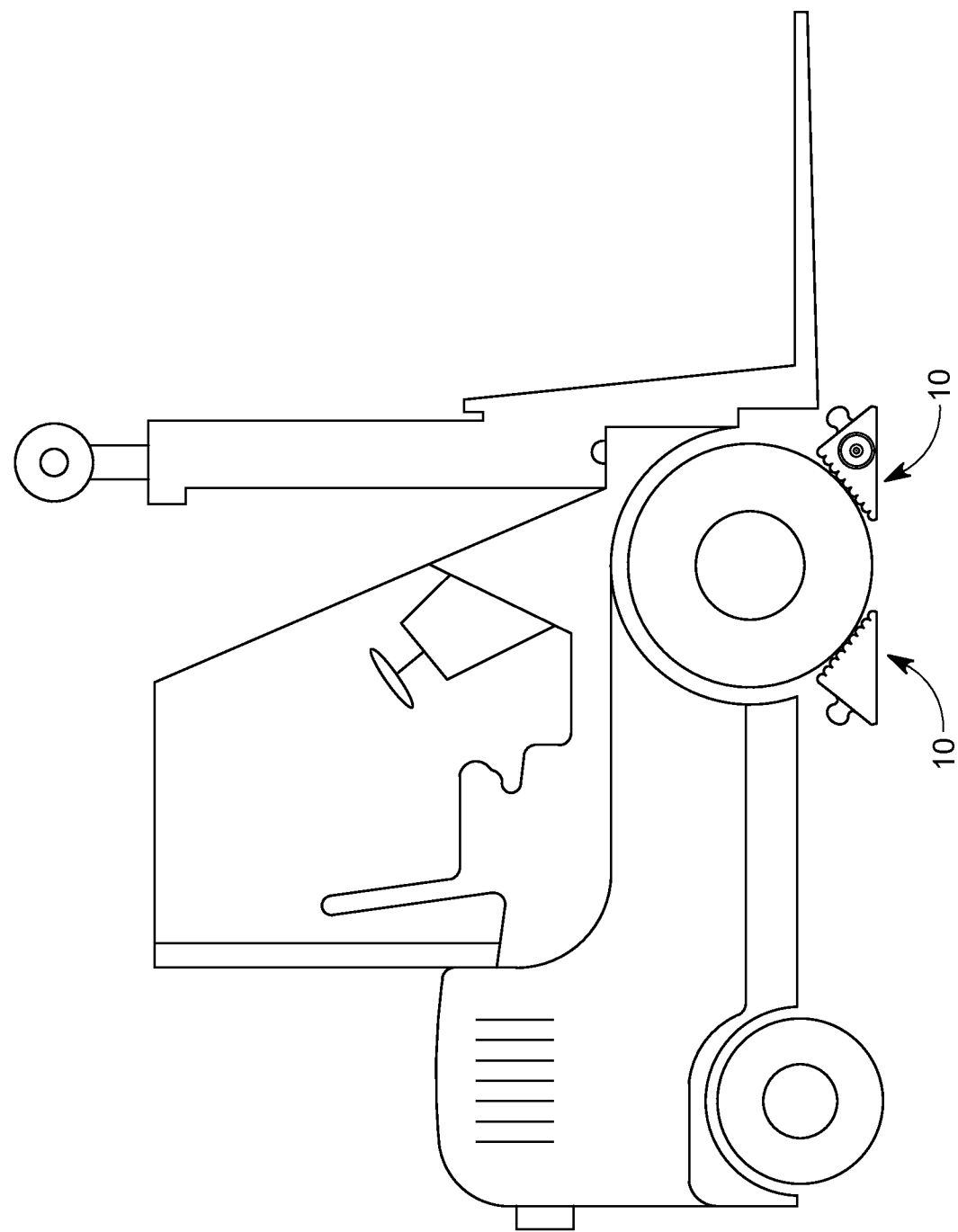
FIG. 3 is a side view of the wheel chocks according to one or more embodiments disclosed herein being positioned near opposed sides of a front tire of machinery equipment.

The handle 20 advantageously allows the user to grab onto the chock 10 for removal from the stowed position (FIG. 2) and the in-use position (FIG. 3). In prior art systems, the user would often try to kick a conventional chock 10 away from the equipment when in the in-use position. This was dangerous to the user's foot and often times led to the chock 10 being underneath of the equipment at that time in response to being kicked, which presented even greater safety concerns.

In embodiments, the base member 12 defines a recess 22 which might be useful for a variety of reasons. For example, FIGS. 4A, and 5-8 show a recess 22 in which portions of a fastener 24 might be disposed to enhance the stability and security of the items affixed to the base member 12 through the fastener 24. In another embodiment, the recess 22 might be accessible through an opening 28, as in FIG. 10. Moreover, the opening 28 might be selectively sealed through the use of a plug 29. Thereby, a user might be able to access portions of the fasteners 24 located within the recess 22 if required. Also, a user might be able to add or remove a weighted material 31 within the recess 22, as in FIG. 11 in embodiments. However, weighted material 31 is disposed within a recess 22 that is inaccessible, in at least one embodiment. Weighted material 31 might comprise glass, metal, or other material beads or bearings in certain embodiments. In other embodiments, sand might be utilized as a weighted material 31. However, these materials should not be considered limiting and the weighted material may take any form or be made from any material considered useful. In some embodiments, the recess 22 might be provided to reduce the material cost of the base member 12 and not have a function. Moreover, the recess 22 might be utilized to store portions of the chock 10 when not affixed to a portion of the chock 10, such as storage of the magnet 16 or extra or alternative magnets 16. In at least one embodiment, the recess 22 can act as storage for the handle 20 or an alternative or extra handle 20 when not affixed to a portion of the chock 10. Moreover, the recess 22 can act as storage of any pivoting portions, such as the handle, as in FIG. 12B, or alternatively, a magnet 16, in pivotally connected in an embodiment.

Particular embodiments and features have been described with reference to the drawings. It is to be understood that these descriptions are not limited to any single embodiment or any particular set of features, and that similar embodiments and features may arise or modifications and additions may be made without departing from the scope of these descriptions and the spirit of the appended claims.

These and other changes can be made to the disclosure in light of the above Detailed Description. While the above description describes certain embodiments of the disclosure, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific embodiments disclosed in the specification, unless the above Detailed Description section explicitly defines such terms. Accordingly, the actual scope of the disclosure encompasses not only the disclosed embodiments, but also all equivalent ways of practicing or implementing the disclosure under the claims.

What is claimed:

1. A wheel chock comprising:
    a base member defining a generally triangular prism shape having two generally triangular sides and at least three faces joining the edges of the sides, wherein at least one of the faces defines a gripping surface;
    a handle for being grasped by a user, the handle disposed on either one of the sides or one of the faces adjacent the one of the faces defining the gripping surface;
    a first magnet disposed along one of the sides of the base member, wherein at least a portion of the first magnet is recessed within the base member; and
    a second magnet disposed along an opposed side of the sides of the base member, wherein the opposed side is opposite that upon which the first magnet is disposed.

2. A wheel chock according to claim 1, wherein the handle is removably attached to one of the sides of the base member.

3. A wheel chock according to claim 1, wherein the handle is removably attached to one of the faces adjacent the one of the faces defining the gripping surface of the base member.

4. A wheel chock according to claim 1, the wheel chock further comprising an attachment port disposed on one or more of one of the sides or one of the faces of the base member, the attachment port configured to selectively engage a portion of the handle to removably attach the handle to the base member.

5. A wheel chock according to claim 1, wherein the base member defines a recess therein.

6. A wheel chock according to claim 5, wherein one of the faces or one of the sides of the base member defines an opening configured to allow access to the recess.

7. A wheel chock according to claim 6, further comprising a plug configured to selectively seal the opening.

8. A wheel chock according to claim 5, further comprising a weighted material disposed within the recess.

9. A wheel chock according to claim 5, further comprising a fastener having a first portion disposed within the recess and a second portion engaged with the first magnet.

10. A wheel chock according to claim 9, wherein the fastener extends through an opening in the side of the base member along which the first magnet is disposed.

11. A wheel chock according to claim 10, wherein the opening comprises a first set of threads which engage a second set of threads disposed along a portion of the fastener.

12. A wheel chock according to claim 5, further comprising a fastener having a first portion disposed within the recess and a second portion engaged with the handle.

13. A wheel chock according to claim 5, wherein the handle is pivotally attached to the base member so that it pivots between a first position where the handle extends away from the base member and a second position where the handle extends into the recess.

14. A wheel chock according to claim 1, wherein the handle is integrally formed with the base member.

15. A wheel chock according to claim 1, wherein the gripping surface comprises a plurality of protrusions extending away from the base member.

16. A wheel chock according to claim 15, wherein at least one of the plurality of protrusions is removably affixed to the base member.

17. A wheel chock according to claim 1, wherein the gripping surface comprises a gripping member having a first surface affixed to the base member and a second surface opposed to the first, the second surface comprising protrusions.

18. A wheel chock according to claim 17, wherein the gripping member is removably affixed to the base member.

19. A wheel chock according to claim 1, wherein at least one of the first magnet and the second magnet is removably attached to the base member.

* * * * *